(12) United States Patent
Thomas et al.

(10) Patent No.: US 9,490,615 B2
(45) Date of Patent: Nov. 8, 2016

(54) SELECTABLE LOCKING FLIP COVER

(71) Applicant: HUBBELL INCORPORATED, Shelton, CT (US)

(72) Inventors: Jason P. Thomas, Mesa, AZ (US); Jonathan Falls, Gilbert, AZ (US); Jeff Hlade, South Bend, IN (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 14/455,286

(22) Filed: Aug. 8, 2014

(65) Prior Publication Data

US 2015/0041467 A1 Feb. 12, 2015

Related U.S. Application Data

(60) Provisional application No. 61/863,997, filed on Aug. 9, 2013.

(51) Int. Cl.
| | | |
|---|---|---|
| *H02G 3/08* | (2006.01) | |
| *H02G 3/10* | (2006.01) | |
| *H02G 3/14* | (2006.01) | |
| *B65D 1/24* | (2006.01) | |
| *B65D 1/36* | (2006.01) | |
| *B65D 25/04* | (2006.01) | |
| *B65D 57/00* | (2006.01) | |
| *B65D 85/00* | (2006.01) | |

(52) U.S. Cl.
CPC .............. *H02G 3/081* (2013.01); *H02G 3/088* (2013.01); *H02G 3/14* (2013.01)

(58) Field of Classification Search
CPC ...... H02G 3/081; H02G 3/086; H02G 3/088; H02G 3/10; H02G 3/14; H02G 15/10; H01B 1/066; H01H 23/06; H01H 9/282
USPC ......................................... 220/3.8, 524, 526
See application file for complete search history.

(56) References Cited

U.S. PATENT DOCUMENTS

| | | |
|---|---|---|
| 3,140,344 A | 7/1964 | Slater et al. |
| 3,200,989 A | 8/1965 | Hubbell |
| 3,252,611 A | 5/1966 | Weitzman et al. |
| 3,515,423 A | 6/1970 | Smidt |
| 4,134,516 A | 1/1979 | Sullo |
| 4,945,559 A * | 7/1990 | Collins et al. ........... 379/413.02 |
| 6,519,208 B2 | 2/2003 | DeVries |
| 7,227,079 B2 | 6/2007 | Noest et al. |
| 7,265,292 B2 | 9/2007 | Greenfield |
| D569,812 S | 5/2008 | Kinnard |
| 7,425,146 B2 * | 9/2008 | Valentin ........................ 439/304 |

(Continued)

*Primary Examiner* — Fenn Mathew
*Assistant Examiner* — Andrew T Kirsch
(74) *Attorney, Agent, or Firm* — Dickinson Wright PLLC (57) ABSTRACT

A cover assembly has a plurality of covers that are movable between an open and closed position to cover access openings in a base. The assembly includes a locking assembly for locking one or more of the covers in the closed position. The locking assembly includes a locking tab on the base that has two locking apertures. One locking aperture receives a lock to overlie a front face of each of the covers to prevent the covers from opening. A second locking aperture is oriented to mate with an aperture in a locking tab on one of the covers to lock the cover in a closed position while allowing the other cover to open independently of the other. In another embodiment, one cover has a flange that overlies at least a portion of the other cover so that locking one of covers prevents both covers from being opened.

16 Claims, 5 Drawing Sheets

(56) References Cited

U.S. PATENT DOCUMENTS

| | | |
|---|---|---|
| 7,462,777 B2 | 12/2008 | Dinh |
| 7,728,226 B2 | 6/2010 | Drane et al. |
| 7,896,665 B2 | 3/2011 | Parrish |
| 8,251,253 B1 | 8/2012 | Cleghorn et al. |
| D669,864 S | 10/2012 | Korcz et al. |
| 2006/0037773 A1 | 2/2006 | Castaldo et al. |
| 2007/0117428 A1* | 5/2007 | Mossner ............... H01R 13/447 439/138 |
| 2011/0174599 A1* | 7/2011 | Whitaker ............... H01H 9/282 200/43.22 |

* cited by examiner

SELECTABLE LOCKING FLIP COVER

CROSS-REFERENCE TO RELATED APPLICATION

This application claims the benefit under 35 U.S.C. §119 (e) of U.S. Provisional Application No. 61/863,997, filed Aug. 9, 2013, which is hereby incorporated by reference in its entirety.

FIELD OF THE INVENTION

The present invention is directed to a weatherproof cover assembly having a locking cover or lid. The invention is particularly directed to a cover assembly having at least two hinged flip covers or lids where the assembly has a locking assembly that is able to lock one of the covers or both of the covers using a single locking member.

BACKGROUND OF THE INVENTION

Electrical devices, such as electrical outlets and switches for outdoor use are required to have a cover to protect the electrical device from water that can damage the electrical device and create a safety hazard. The covers for outdoor use are generally referred to as weatherproof covers that can be opened to access the electrical device. The covers are required to close automatically either by gravity or by a spring loaded door. In many instances, it is desirable to have a suitable locking mechanism to lock the covers in a closed position to prevent unauthorized use or access to the electrical device.

Various locking mechanisms have been proposed to lock a cover in a closed position. One example is disclosed in U.S. Pat. No. 3,104,344 to Slater disclosing a weatherproof receptacle cover having a hinged cover with an eye member that cooperates with a hook member. The shank of the hook extends through the eye member for locking in the cover is closed position.

U.S. Pat. No. 3,200,989 to Hubbell discloses a locking weatherproof cover where the cover has a pair of spaced-apart locking feet where each is provided with an aperture. A ring portion on the mounting plate extends through the aperture when the cover is closed. A padlock shown in FIG. 1 can extend through the ring portion to lock the cover in the closed position.

U.S. Pat. No. 3,515,423 to Smidt discloses a locking device for an enclosure for a switch. The locking device includes a locking post with a head having an aperture to receive the shaft where the shank of a padlock is passed through the aperture. The padlock prevents the locking post from being rotated to the unlocked position to prevent opening of the cover.

U.S. Pat. No. 6,519,208 to DeVries discloses a locking timer assembly having a cover. The cover and the base have loop members for receiving a padlock to lock the cover in the closed position.

U.S. Pat. No. 7,227,079 to Noest et al. discloses a weatherproof cover and a disconnect switch. The cover has a locking button that secures the switch in either the on position or the off position. The lockout mechanism locks the switch in the off position preventing unauthorized movement of the switch.

U.S. Pat. No. 7,896,665 to Parrish discloses an electrical panel assembly having individual electrical panel modules. Each module has a hinged door to pivot between an open and closed position. The base of the module has a locking ring 104 shown in FIG. 1 that extends through an aperture in the respective cover. The ring can receive a lock to lock the respective cover in the closed position.

U.S. Pat. No. 7,265,292 to Greenfield, U.S. Pat. No. 7,462,777 to Dinh, U.S. Pat. No. 7,728,226 to Drane, U.S. Pat. No. D569,812 to Kinnard, U.S. Pat. No. D669,864 to Korcz et al., U.S. Pat. No. 8,251,253 to Cleghorn and U.S. Patent Publication No. 2006/0037773 to Castaldo et al. disclose various weatherproof while-in-use covers where the cover and the base each have an eyelet or loop for locking the cover in the closed position.

While the prior devices are generally suitable for their intended use, there is a continuing need in the industry for improve weatherproof covers have a locking mechanism.

SUMMARY OF THE INVENTION

The present invention is directed to a cover assembly for an electrical device. The invention is particularly directed to a weatherproof cover assembly having a locking assembly and mechanism that can lock at least one cover in a closed position.

One feature of the invention is to provide a weatherproof cover having at least two covers that can be moved between an open position and a closed position to cover at least one electrical device. A locking mechanism is provided to enable locking at least one of the covers in the closed position.

Another feature of the invention is to provide a cover assembly for an electrical device, such as an electrical outlet where the cover assembly has at least two hinged covers and where a single locking member is able to lock each of the covers in a closed position.

The cover assembly of the invention in one embodiment has two hinged covers for covering two electrical devices, where each of the covers is hinged independently of the other. A locking mechanism is provided to lock one of the covers or both of the covers as needed.

The cover assembly in another embodiment has at least two hinged covers where a portion of a first cover overlaps at least a portion of the second cover so that locking the first cover in the closed position also locks and retains the second cover in the closed position.

The cover assembly of the invention has a base with an opening for receiving an electrical device and at least two covers that are coupled to the base to allow the covers to move between a closed position and an open position. In one embodiment of the invention, the base has at least two openings for a respective electrical device and a cover for each of the two openings and the respective electrical device. A locking mechanism is provided so that a single lock member is able to lock one or both of the covers.

The cover assembly in one embodiment has a base with two opening having a dimension to receive a respective electrical device and two covers hinged to the based for covering a respective opening and electrical device. A locking tab is provided on the base and a locking tab is provided on one of the covers for cooperating with a locking member to lock at least one of the covers in the closed position. In one embodiment, the locking tab on the base has two spaced apart apertures for receiving the locking member. A first aperture is positioned above the two covers so that the locking member overlies a portion of the two covers and prevents both covers from opening. A second aperture is spaced outwardly from an edge of the covers and aligns with an aperture on one of the covers so that the locking member locks only one of the covers while allowing the other cover to open and close.

The various aspects and features of the invention are basically attained by providing a weatherproof cover assembly for an electrical wiring device comprising a base, a first cover and a second cover. The base has a first opening for receiving a first electrical wiring device and a second opening next to said first opening for receiving a second electrical wiring device. The first cover is hinged to the base for pivoting between an open position to access the first electrical wiring device and a closed position covering the first electrical wiring device. The second cover is hinged to the base for pivoting between an open position to access the second electrical wiring device and a closed position covering the second electrical wiring device. A locking tab is provided on the base for cooperating with a locking member to simultaneously lock the first and second covers in the closed position.

The features of the invention are also attained by providing weatherproof cover assembly for an electrical wiring device comprising a base, a first cover and second cover where the base has a first opening for receiving a first electrical wiring device and a second opening next to said first opening for receiving a second electrical wiring device. The first cover is hinged to the base for pivoting between an open position to access the first electrical wiring device and a closed position covering the electrical wiring device. The second cover is hinged to the base for pivoting between an open position to access the second electrical wiring device and a closed position covering the second electrical wiring device. A locking tab is provided on the base for cooperating with a locking member for selectively locking the second cover or simultaneously locking the first cover and second cover in the closed position.

The various features of the invention are further attained by providing weatherproof cover assembly for an electrical wiring device comprising a base, a first cover and a second cover. The base has a first opening for receiving a first electrical wiring device and a second opening next to said first opening for receiving a second electrical wiring device. The first cover is hinged to the base for pivoting between an open position to access the first electrical wiring device and a closed position covering the first electrical wiring device. The second cover is hinged to the base for pivoting between an open position to access the second opening and a closed position covering the second electrical wiring device. A locking tab is provided on the base and a locking tab is provided on one of the first cover or second cover. Each tab is configured for cooperating with a locking member for simultaneously locking the first cover and second cover in the closed position.

These and other features of the invention will become apparent from the following detailed description of the invention, which in conjunction with the annexed drawings disclose various embodiments of the invention.

BRIEF DESCRIPTION OF THE DRAWINGS

The following is a brief description of the drawings in which.

DESCRIPTION OF THE INVENTION

The present invention is directed to a weatherproof cover assembly having at least two hinged lids or covers that can be selectively locked in the closed position. The invention is particularly directed to a weatherproof cover assembly where a single locking device is able to lock two or more covers of the cover assembly in the closed position.

The cover assembly of the invention is configured for mounting to the open end of an electrical box that supports one or more electrical wiring devices where the electrical wiring devices are accessible through the openings in the cover assembly. One or more of the covers can be locked while allowing at least one of the covers to move to an open position to access the electrical wiring device.

Referring to FIGS. 1-6, the weatherproof cover assembly 10 in a first embodiment of the invention includes a base 12, a first cover 14 and a second cover 16. In the embodiment shown and described herein, the base has two covers for covering two electrical wiring devices in a two-gang electrical box. In other embodiments, the cover assembly can have more than two covers for covering more than two electrical wiring devices, such as for example, a three gang electrical box. In another embodiment, the cover assembly can have two hinged covers that overlie different portions of a single electrical wiring device where each cover can be opened and closed independently of the other to access the selected portion of the electrical wiring device.

Figure 2:
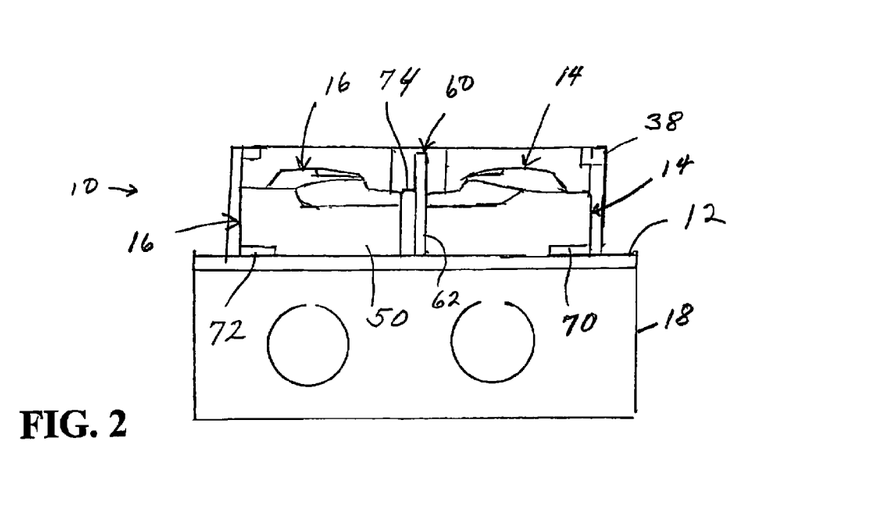
FIG. 2 is a front elevational view of the cover assembly of FIG. 1.

The base 10 in the embodiment shown in FIG. 2 has a substantially flat planar configuration and is adapted and configured for mounting to the open end of an electrical box 18 or to an electrical wiring device 19. The electrical wiring device 19 can be, for example, a duplex electrical receptacle, switch, GFCI device or other electrical device that can be mounted to the electrical box 18. The electrical wiring device can be standard device that has tabs or mounting straps with threaded screw holes for receiving mounting screws for attaching a cover plate and the cover assembly to the wiring device.

The electrical box 18 has a standard dimension for mounting to a wall or other supporting surface. The electrical box in the embodiment shown is a two-gang electrical box although the electrical box can be a multi-gang box as known in the art. In the embodiment shown, the electrical box is weatherproof box constructed for outdoor use. The electrical box 18 preferably has standard mounting tabs for mounting the electrical wiring device. The electrical box 16 can also have mounting tabs with screw holes for receiving mounting screws to attach a cover plate to the electrical box.

The base 12 in the embodiment shown has a front face 20 with access openings 22 and 24 having a dimension to complement the dimensions of the electrical wiring device so that the wiring device is accessible through the respective access openings 22 and 24. The base 12 has a dimension to cover and close the open end of the electrical box 18 and to cover the electrical wiring devices. In one embodiment, the base 12 has a substantially square or rectangular configuration with a dimension corresponding to the number of electrical wiring devices to be covered by the base.

Figure 1:
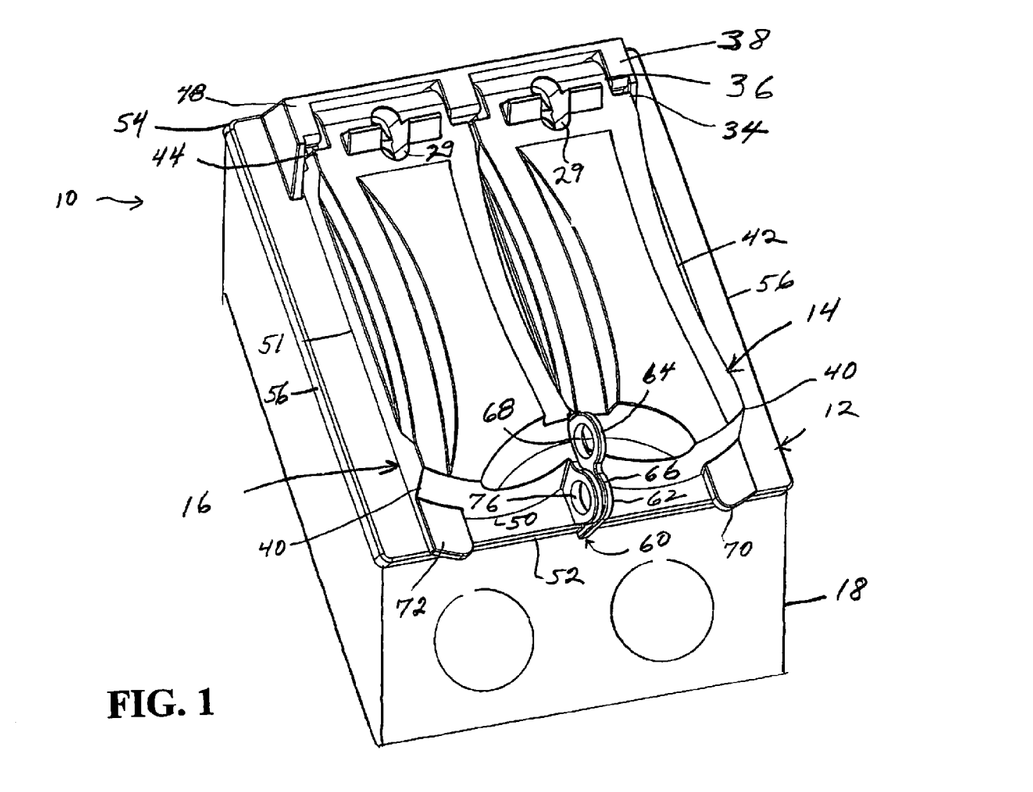
FIG. 1 is a perspective view of the cover assembly in a first embodiment of the invention.

In the embodiment shown, the base 12 is provided with screw holes 26 and 27 for receiving a mounting screw 28 to mount the cover assembly 10 to the electrical box or electrical wiring device by screwing into the threaded holes in the tabs of the electrical box 18 or the threaded hole in mounting strap of the electrical wiring device in a manner known in the art. In the embodiment shown, the screw hole 26 has a key-hole shape with an open portion 30 to allow the head of the screw to pass through and a recessed portion with a slot 32 to receive the head of the screw to attach the cover assembly to the electrical box and allow lateral adjustment of the cover assembly with respect to the electrical box. The base 12 has a keyhole shaped screw hole opening 26 along a bottom edge 52 and a top edge 54 of the base 12. The covers 14 and 16 have an screw hole opening 29 to allow access to the keyhole shaped openings 26 along the top edge of the base for tightening the screws. In one embodiment of the invention, the keyhole shaped openings 26 are positioned on the base so that the keyhole shaped openings 26 are covered and enclosed by the respective cover 14 and 16 as shown in FIG. 1. Longitudinal side edges 56 of the base 12 extend between the bottom edge 52 and top edge 54.

In the embodiments shown, the covers 14 and 16 are coupled to the base 12 to move between an open position to access the electrical device and a closed position to cover the electrical device. In one embodiment, the covers are hinged to the base 12 to pivot along one edge of the covers and the base. In other embodiments, the covers can be mounted on sliding tracks to slide to an open position or mounted for pivoting about an axis perpendicular to the plane of the base 12.

The covers in the embodiment shown are substantially the same and have a dimension to cover and enclose the respective opening 22 and 24 and the electrical wiring device received in the respective opening to provide a weatherproof cover for the electrical wiring devices. The covers 14 and 16 can have a gasket or seal member for forming the weatherproof seal between the covers and the base 12 and protect the electrical wiring device from water and dirt.

The covers 14 and 16 in the embodiment shown are hinged to the base 12 and pivot about a common axis so that the covers pivot upward in the normal mounting position to the open position and pivot downward to the closed position. A spring can be provided to bias and pivot the covers to the closed position.

In the embodiment shown, the first cover 14 is hinged to the base 12 along a top edge 34 of the cover by a hinge member 36 and a hinge member 38 on the base 12 to allow the cover 14 to pivot between an open position to allow access to the electrical wiring device and a closed position shown in FIG. 1. A hinge pin extends through the hinge member 36 and hinge member 38 to couple the cover 14 to the base 12 and allow the cover 14 to pivot upwardly as shown a distance to allow access to the electrical wiring device. The first cover 14 has a longitudinal bottom end 40 opposite the top edge 34 and side edges 42 extending between the top end 34 and the bottom end 40.

The second cover 16 is similar to the first cover 14 and is hinged to the base 12 along a top edge 44 by a hinge member 46 coupled to the cover 16 and a hinge member 48 coupled to the base 12. A hinge pin extends through the hinge members 46 and 48 to couple the cover 16 to the base and allow the cover 16 to pivot between the open position to access the electrical wiring device and the closed position as shown in the drawings. The second cover 16 has a longitudinal bottom edge 50 opposite the top edge 44 and side edges 51 extending between the top edge 44 and bottom edge 50.

In one embodiment of the invention as shown, the covers 14 and 16 are substantially parallel and pivot about a common axis so that the pivot axis of the first cover 14 and the pivot axis of the second cover 16 are coaxially aligned. The covers 14 and 16 are adjacent each other with adjacent side edges extending substantially parallel to each other.

The bottom end 34 includes a locking tab 36 extending outwardly from the first cover 14. The locking tab 36 of the first cover 14 includes a locking aperture 38.

The second cover 16 has a top end 40 that is hinged to the base 12 by a hinge pin to allow the second cover 16 to pivot between an open position and a closed position with respect to the electrical wiring device and the opening 20 in the base 12. The second cover 16 has a bottom longitudinal end 42 opposite to the top end 40.

The cover assembly 10 has a locking assembly 60 that is able to lock one or more of the covers 14 and 16 in the closed position. In one embodiment of the invention, the locking assembly is able to lock at least one of the covers 14 and 16 in a closed position while allowing the other cover to open and close allowing access to the electrical wiring device and is able to lock both of the covers in the closed position. In the embodiment shown in FIGS. 1-6, the base 12 includes a locking tab 62 positioned on the front face at the bottom edge 52 of the base 12 and next to the bottom edges 40 and 50 of the covers 14 and 16, respectively. In the embodiment shown, the locking tab 62 is positioned between the first cover 14 and the second cover 16.

Figure 3:
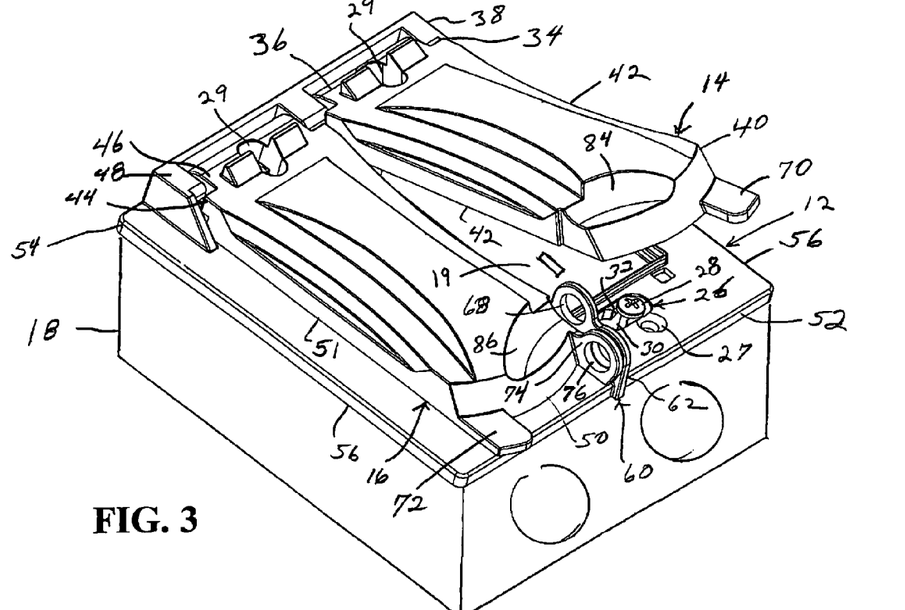
FIG. 3 is left side perspective view of the cover assembly of FIG. 1 showing the cover partially open.
Figure 4:
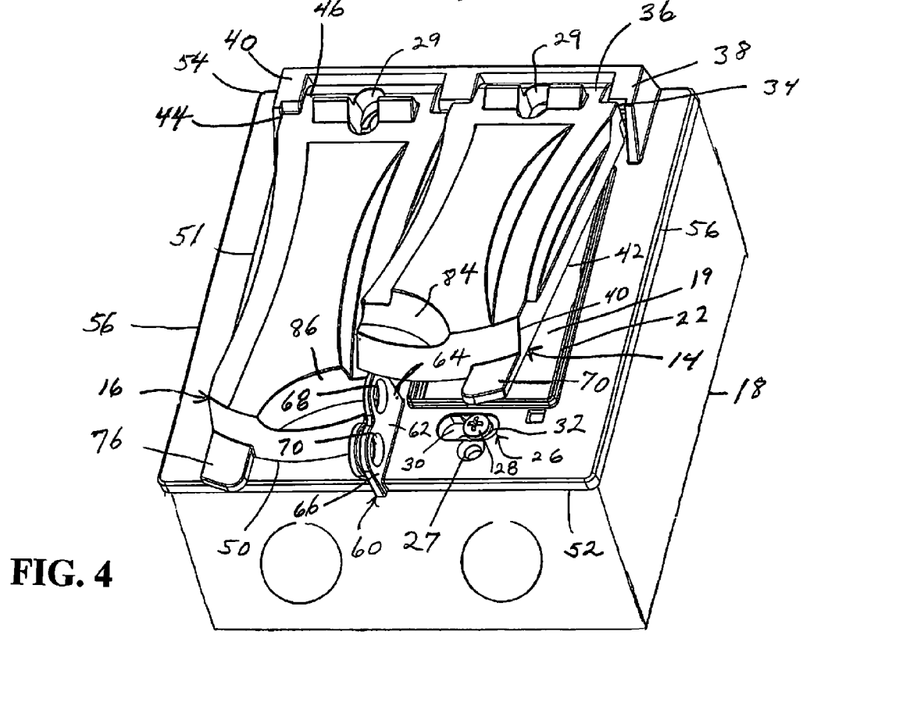
FIG. 4 is perspective of the cover assembly of FIG. 1.

The locking tab 62 has a first portion 64 positioned between the covers 14 and 16 and a second portion 66 spaced outwardly from the bottom edges of the covers 14 and 16 as shown in FIGS. 1, 3 and 4. The first portion 64 of the locking tab 62 includes a first locking aperture 68 between the covers 14 and 16. The first portion of the locking tab 62 has a height greater than the thickness of the covers 14 and 16 to extend above the outer face of the covers when the covers are in the closed position so that the locking aperture 68 is spaced outwardly from the front face of the first cover 14 and second cover 16. The second portion 66 of the locking tab 62 also includes a second locking aperture 70 that is positioned outwardly from the bottom edges of the first cover 14 and the second cover 16.

Figure 5:
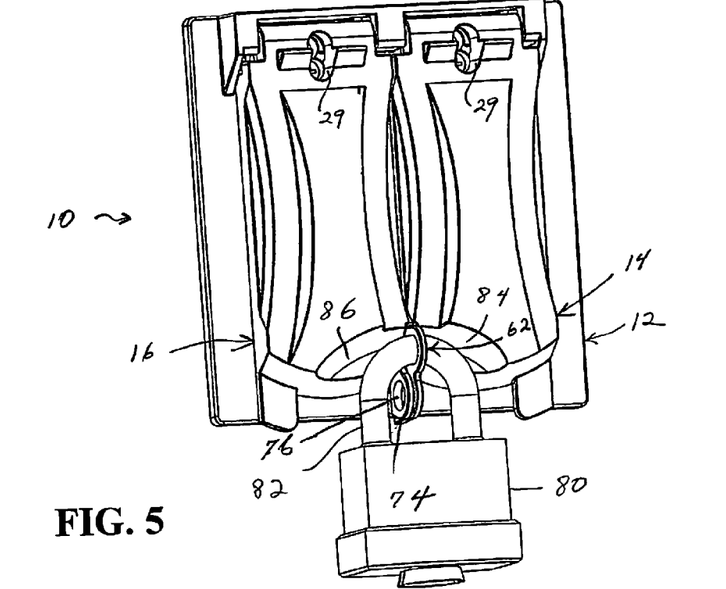
FIG. 5 is a top view of the cover assembly of FIG. 1 showing the covers in the locked position.
Figure 6:
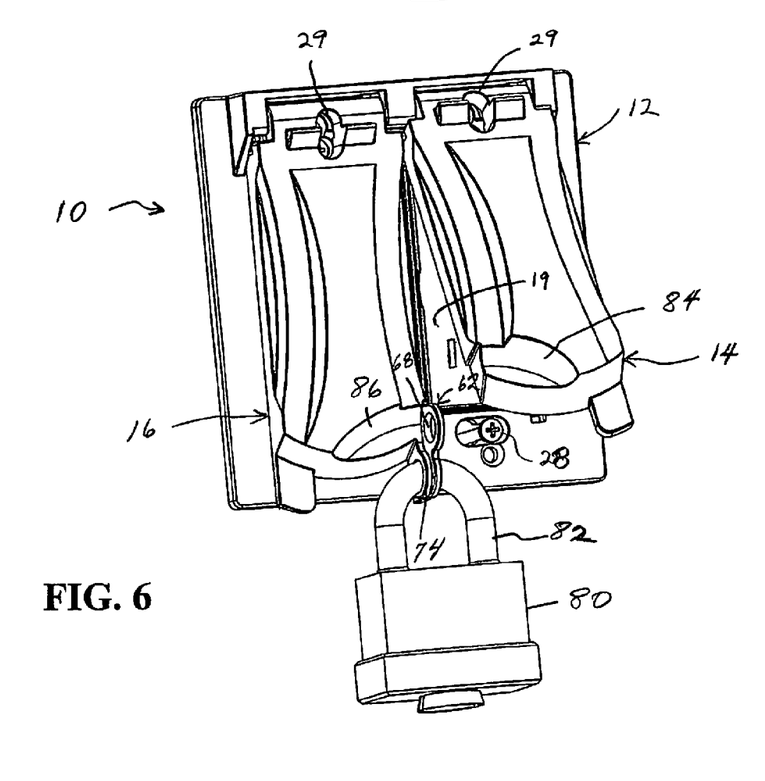
FIG. 6 is top view showing one cover in the locked position.

In the embodiment shown, each of the covers 14 and 16 include a recessed area 84 and 86 in the respective top front face along the adjacent side edges. In the embodiment shown, the recesses 84 and 86 have a curved concave area aligned with the locking aperture 68 to enable a lock to pass through the aperture 68 as shown in FIGS. 5 and 6.

The first cover 14 has a lifting tab 70 extending from the bottom edge 42 for opening and closing of the first cover 14. The second cover 16 has a lifting tab 72 extending from the bottom edge 50 for opening and closing the second cover 16. A locking tab 74 also extends from the bottom edge 50 of the second cover and is oriented to align with the locking tab 62 on the base 12. The locking tab 74 on the second cover 16 has a locking aperture 76 positioned for aligning with the aperture 70 in the locking tab 62 on the base 12. The first aperture 68 is oriented with respect to the covers 14 and 16 so that a locking member extending through the first aperture 68 is able to lock the first cover 14 and the second cover 16 in the closed position as shown in FIG. 5. The second aperture 70 in the locking tab 62 and the aperture 76 in the locking tab 74 of the second cover 16 are positioned outwardly from the bottom edge of the first cover 14 so that a locking member passing through the apertures locks the second cover 16 in the closed position while allowing the cover 14 to pivot freely between the open and closed position as shown in FIG. 6.

During use, the first cover 14 and the second cover 16 can be opened and closed independently of each other as shown in FIGS. 1 and 2. A lock member 80, such as a conventional padlock having a shank 82, can be inserted through the locking apertures of the locking tabs to lock one or both covers in the closed position. As shown in FIG. 5, the shank 82 of the lock 80 can be passed through the first locking aperture 68 of the locking tab 62 on the base 12 so that the shank 82 overlies the front face of the first cover 14 and the front face of the second cover 16 to prevent both covers 14 and 16 from opening. The shank 82 of the locking member 80 alternatively can be passed through the aperture 78 of the locking tab 74 on the second cover 16 and the aperture 70 in the locking tab 62 to lock the second cover 16 in the closed position while allowing the first cover 14 to open and close independently of the second cover 16 as shown in FIG. 6.

In another embodiment of the invention shown in FIGS. 6-9, the locking weatherproof cover assembly 90 includes a base 92, a first cover 94 and a second cover 96. As in the previous embodiment, the first cover 94 and second cover 96 are hinged to the base 92 by hinge members and a hinge pin hinge pin to allow the covers to pivot between an open and closed position. The covers 94 and 96 are pivotally coupled to the base plate 92 to pivot along a top edge of the covers as in the previous embodiment.

The base 92 has a front face 98 with a shape and dimension for mounting to an electrical box and having access openings 100 for receiving the electrical wiring device as in the previous embodiment. Keyhole shaped slots 102 and screw holes 104 extend through the base 92 at the top and bottom ends for receiving a mounting screw 106 to couple the assembly 90 to the electrical box 108.

The first cover 94 has a top edge 110 hinged to the base 92, a bottom edge 112, a first side edge 114 and a second side edge 116 extending between the top edge 110 and the bottom edge 112. A lifting tab 118 extends from the bottom edge 112 for pivoting the cover 94 to the open and closed positions. In the embodiment shown, the lifting tab 118 has a planar surface oriented substantially parallel to a plane of the cover 92. A locking tab 120 extends from the bottom edge of the cover 92 and includes a locking aperture 122 with a dimension to receive the shank of a locking member. In the embodiment show, the locking tab 120 is oriented in a plane substantially perpendicular to the plane of the base 92 so that the axis of the aperture 122 is substantially perpendicular to the plane of the base 92.

The second cover 96 is also hinged to the base 92 next to or adjacent the first cover 94 so that the two covers pivot about the same axis. The second cover 96 has top edge 124, a bottom edge 126, a first side edge 128, and a second side edge 130 opposite the first side edge 128. The first side edge 130 of the second cover 96 is adjacent the second side edge 116 of the first cover 94 in the closed position as shown. A lifting tab 132 extends from the bottom edge of the second cover 96 for opening and closing the cover.

In the embodiment shown, the cover assembly 90 has a locking assembly that that is able to lock the two covers in the closed position using a single locking member. In other embodiments, the locking assembly can lock one of the covers in the closed position while allowing the other cover to pivot to open and close the cover. In the embodiment shown, the locking assembly prevents both of the covers from opening when of the covers are locked.

Figure 7:
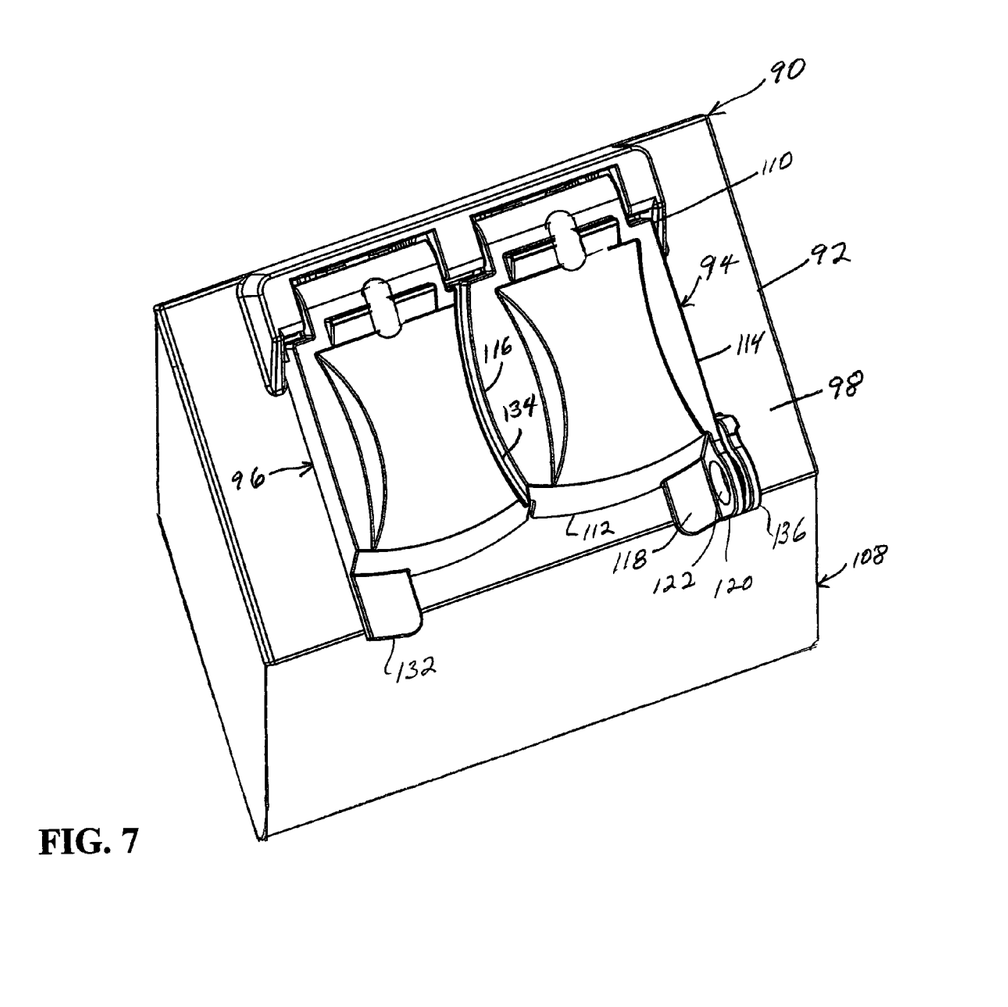
FIG. 7 is perspective view of a cover assembly in a second embodiment of the invention showing the covers in the closed position.
Figure 8:
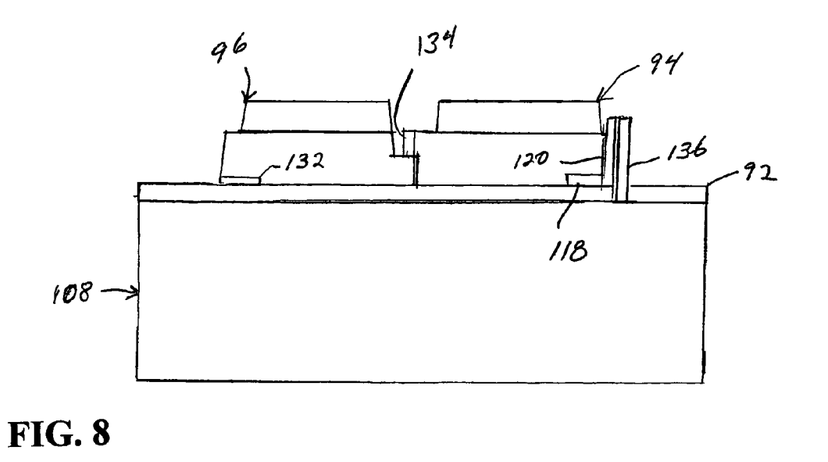
FIG. 8 is a front elevational view of the cover assembly of FIG. 7.
Figure 9:
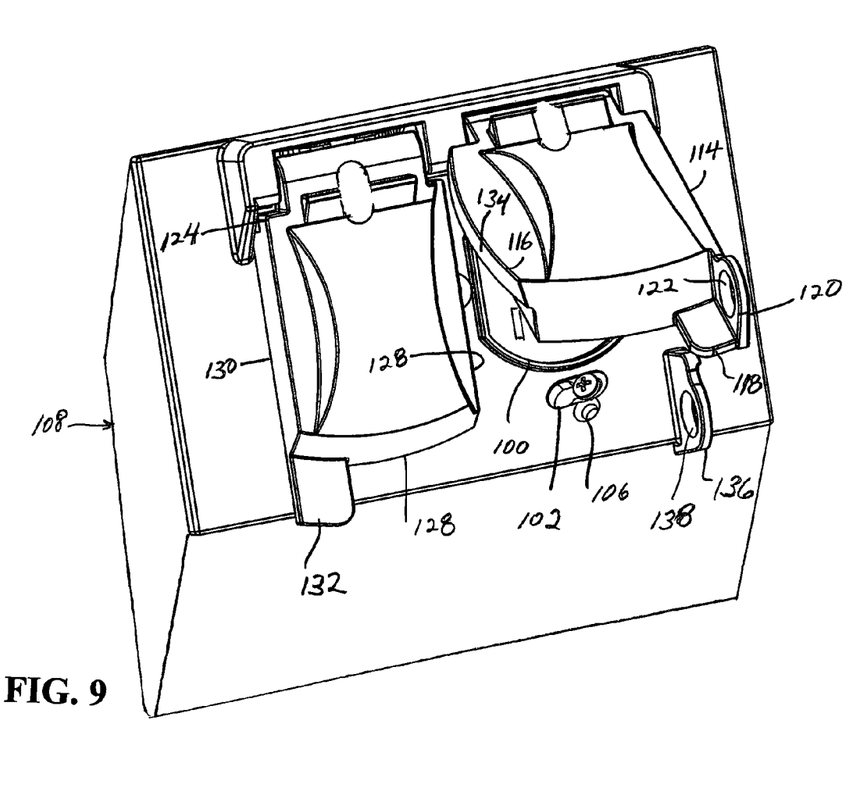
FIG. 9 is a perspective view of the cover assembly of FIG. 7 showing the cover in the partially open position.

The locking assembly in the embodiment of the invention is a flange 134 that extends outwardly from the second side edge 116 of the first cover 94. The flange 134 is spaced from a bottom face of the cover 94 a distance corresponding to the thickness of the second cover 96 along the side edge 130 of the second cover. The flange 134 is oriented to overlie at least a portion of the first side edge 128 of the second cover 96 when the first cover 94 and the second cover 96 are in the closed position as shown in FIG. 7.

The flange 134 overlies the second cover 96 so that the second cover 96 cannot be opened when the first cover 94 is locked in the closed position without also opening the first cover 94. The first cover 94 can be opened and closed independently of the second cover 96 and without opening the second cover 96.

The first cover 94 has the locking tab 120 with the locking aperture 122 for locking the cover in the closed position. The locking aperture 122 has a dimension to receive the shank of a padlock as in the previous embodiment. The base 92 has a locking tab 136 extending outwardly from the front face 98. The locking tab 136 includes a locking aperture 138 to align with the locking aperture of the locking tab 120 on the cover 94. The locking tab 136 on the base 92 is positioned on the base 62 to align with the locking tab 120 of the first cover 94 when the second cover 66 is in the closed position as shown in FIG. 6.

In the closed position, the aperture 122 of locking tab 120 on the cover 94 is aligned with the aperture 138 of the locking tab 134 on the base 92. The shank of a padlock or other locking member can be passed through the apertures 122 and 138 to lock the first cover 94 in the closed position. The flange 134 on the first cover 94 overlies the second side edge 130 of the second cover 96 a distance sufficient to prevent the second cover 96 from being opened when the first cover 94 is in the locked position. In this manner, a single lock is able to lock both the first cover 94 and the second cover 96 in the closed position.

In the embodiments of the invention shown and described, the weatherproof cover is a two gang assembly for use with two electrical wiring devices. In alternative embodiments, the weatherproof cover can be a three or multi-gang cover assembly with the appropriate number of covers and access openings in the base. Each of the covers can be constructed in the manner shown in the drawings to enable one or more of the covers to open and close independently of the other and to enable locking of all of the covers using one or more locking members.

In the embodiments shown, the covers are coupled to the base so that the covers pivot along the same axis at the same end of the covers. In other embodiments, the covers can pivot about a different axis. The first cover can be coupled to the base to pivot about an axis that is parallel to or substantially perpendicular to the pivot axis of the second cover. The covers can pivot about the side edges of the respective covers along the opposite sides to open outwardly away from each other. The locking assembly is then positioned to lock one or both cover in the closed position as shown and described herein.

While various embodiments of the invention have been shown to illustrate the invention, it will be understood that various changes and modifications can be made without departing from the scope of the invention.

What is claimed is:

1. A weatherproof cover assembly for an electrical wiring device comprising:
    a base having at least one opening for receiving a first electrical wiring device and a second electrical wiring device;
    a first cover hinged to said base for pivoting between an open position to access said first electrical wiring device and a closed position covering said first electrical wiring device and closing said opening in said base;
    a second cover hinged to said base for pivoting between an open position to access said second electrical wiring device and a closed position covering said second electrical wiring device; and
    a locking tab on said base between said first cover and said second cover for cooperating with a locking member in a first position with respect to said locking tab to simultaneously lock said first and second covers in the closed position and cooperating with the locking member in a second position with respect to said locking tab to lock said second cover in a closed position without locking said first cover and allowing said first cover to pivot between said open position and closed position.

2. The assembly of claim 1, wherein
    said locking tab is oriented whereby said locking member in said first position overlies at a least a portion of said first cover and a front face of said second cover to lock said first cover and said second cover in the closed position.

3. The assembly of claim 1, wherein
    said locking tab on said base has a first aperture for receiving the locking member in said first position, and where said first aperture is oriented to position the locking member over at least a portion of a front face of said first cover and at least a portion of said second cover.

4. The assembly of claim 3, wherein
    said locking tab on said base has a second aperture to receive the locking member in said second position to lock said second cover in a closed position without locking the first cover.

5. The assembly of claim 1, wherein
    said locking tab on said base has an aperture configured for receiving the locking member, and
    said second cover has a locking tab with an aperture to align with said aperture in said tab on said base when said second cover is in the closed position.

6. The assembly of claim 4, wherein
    said second aperture in said locking tab and said locking member in said second position are spaced from said first cover to allow said cover to pivot between the open position and closed position.

7. A weatherproof cover assembly for an electrical wiring device comprising:
    a base having an opening for receiving a first electrical wiring device and a second electrical wiring device;
    a first cover hinged to said base for pivoting between an open position to access said first electrical wiring device and a closed position covering said first electrical wiring device and closing said opening in said base;
    a second cover hinged to said base for pivoting between an open position to access said second electrical wiring device and a closed position covering said second electrical wiring device and closing said opening in said base; and
    a locking tab on said base for receiving a locking member in a first position for selectively locking said first cover and second cover in the closed position, and for receiving the locking member in a second position for locking said second cover in the closed position and allowing said first cover to pivot between the open position and the closed position.

8. The assembly of claim 7, wherein
    said locking tab is oriented whereby said locking member in said first position overlies at a least a portion of said first cover and at least a portion of said second cover to lock said first cover and said second cover in the closed position.

9. The assembly of claim 7, wherein
    said locking tab on said base has a first aperture for receiving the locking member in said first position, and where said first aperture is oriented to position the locking member over at least a portion of said first cover and at least a portion of said second cover.

10. The assembly of claim 9, wherein
    said locking tab on said base has a second aperture to receive the locking member in the second position to lock said second cover in a closed position without locking the first cover.

11. The assembly of claim 10, wherein
    said locking tab is positioned between said first cover and said second cover, and said first aperture is oriented between said first cover and said second cover and spaced outwardly from a front face of said first cover and second cover.

12. The assembly of claim 11, wherein
    said second aperture is spaced outwardly from a side edge of said first cover and second cover.

13. A weatherproof cover assembly for an electrical wiring device comprising:
    a base having an opening for receiving a first electrical wiring device and a second electrical wiring device;
    a first cover hinged to said base for pivoting between an open position to access said first electrical wiring device and a closed position covering said first electrical wiring device and closing said opening in said base;
    a second cover hinged to said base for pivoting between an open position to access said second electrical wiring device and a closed position covering said second electrical wiring device and closing said opening in said base; and
    a locking tab with an aperture on said base and a locking tab with an aperture on said first cover, each of said tabs configured for cooperating with a locking member for simultaneously locking said first cover and second cover in the closed position, and where said first cover overlies at least a portion of said second cover in the closed position to retain said second cover in the closed position when said first cover is locked in the closed position.

14. The assembly of claim 13, wherein
    said first cover has a flange overlying at least a portion of said second cover in the closed position to lock said second cover in the closed position when said first cover is in the locked position.

15. The assembly of claim 14, wherein
    said aperture in said locking tab of said first cover aligns with said aperture of the locking tab of said base to lock said first cover and second cover in the closed position.

16. The assembly of claim 13, wherein
    a flange on said first cover extends outwardly from a side edge of said first cover and overlies a side edge of said second cover next to said side edge of said first cover.

* * * * *